(No Model.)

P. AMBJÖRN COMTE DE SPARRE.
ELASTIC TIRE FOR WHEELS.

No. 576,352. Patented Feb. 2, 1897.

Witnesses
Inventor

UNITED STATES PATENT OFFICE.

PIERRE AMBJÖRN COMTE DE SPARRE, OF PARIS, FRANCE.

ELASTIC TIRE FOR WHEELS.

SPECIFICATION forming part of Letters Patent No. 576,352, dated February 2, 1897.

Application filed December 2, 1895. Serial No. 570,824. (No model.)

*To all whom it may concern:*

Be it known that I, PIERRE AMBJÖRN COMTE DE SPARRE, a subject of the King of Sweden and Norway, residing at Paris, France, have invented new and useful Improvements in and Relating to Elastic Tires for Wheels, of which the following is a specification.

My invention relates to elastic tires for the wheels of bicycles, tricycles, and other velocipedes or vehicles, the object of my invention being to provide improved means for rendering tires elastic and yielding without the use of an inflated air-chamber.

Figure 1:
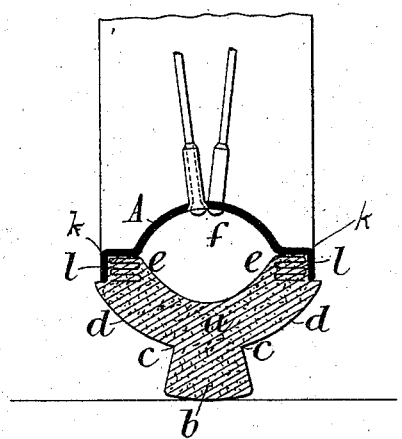
Figure 2:
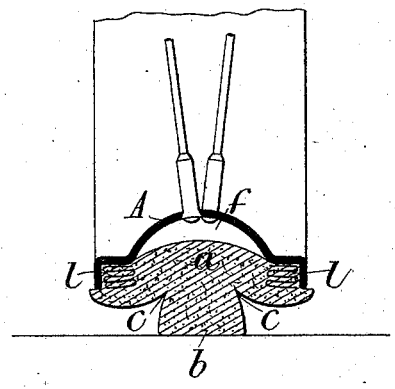

In the accompanying drawings, Figure 1 is a transverse section of an elastic tire constructed according to my invention and fitted to the rim of a wheel, the tire being in its normal condition, that is to say, of the shape which it has when not borne upon by a load. Fig. 2 is a similar view showing the tire of the shape which it may assume under the influence of a load.

The tire $a$, made of rubber or other similar material, is molded of an arch or channel shape, the extremities or edges of which are designed to lie upon the wheel-rim A. The tread of the tire is formed by a projecting rib or flange $b$, which is narrower at its point of contact $c\ c$ with the arch $d\ d$ than the distance between the inner sides of the arch $e\ e$ at the extremities, the said rib or flange being preferably of the same width or slightly narrower at its base $c\ c$, where it joins the arch part of the tire, than at the tread. With this construction the weight upon the tire is transmitted to the arch $a$ through the narrow rib or flange $b\ b$, forming the tread, so that the said arch is pushed back more or less toward the rim and is not allowed to expand loosely sidewise, as in all previous so-called "cushion-tires," when it meets an obstacle on the road.

In practice I provide the wheel-rim with side flanges $k\ k$ to retain the tire in its proper position upon the rim, and I also find it advantageous to make the wheel-rim with a recess or groove $f$ around its periphery, into which the tire can enter when pushed inward through contact with an obstacle.

In order to give the extremities or edges of the arch or channel the required rigidity to prevent them from leaving the side flanges $k$ $k$, I mold the rubber tires with a strip or strips of canvas or other suitable fabric fluted or folded backward and forward, as shown at $l$.

The shape of the rim and tire shown in the drawings is that which I have found to be the most suitable, but it will be obvious that I can vary the same more or less and still obtain similar results to those hereinbefore described.

Having now particularly described and ascertained the nature of my said invention and in what manner the same is to be performed, I declare that what I claim is—

1. The combination with a wheel-rim having a central groove or channel, bearing portions at each side of said channel, parallel to the axis of the wheel, and lateral retaining-flanges perpendicular to said bearing portions of a cushion-tire having a body arch-shaped in cross-section, the lateral edges of said body being angular and adapted to engage the said bearing portions and retaining-flanges of said rim, said body having a central tread narrower than the channel in said rim, an integral strip of flexible material disposed in several overlapping folds, transversely of the wheel and embedded in each of the lateral edges of said tire, substantially as described.

2. The combination with a wheel-rim, of a cushion-tire having a solid, molded, arch-shaped main body and a tread portion projecting therefrom, having a broad earth-engaging face, said tread portion being narrower at its junction with said arch portion than at its outer surface, substantially as described.

3. The combination with a wheel-rim, of a cushion-tire having a solid, molded, arch-shaped main body, thickest along its central portion and slightly thinner adjacent to the rim-engaging portions, and having a projecting tread portion having a broad earth-engaging face, said tread portion being narrower at its junction with said arch portion than at its outer surface, substantially as described.

PIERRE AMBJÖRN COMTE DE SPARRE.

Witnesses:
JOHN E. BOUSFIELD,
A. ALBUTT.